(12) United States Patent
Shen et al.

(10) Patent No.: US 12,512,747 B2
(45) Date of Patent: Dec. 30, 2025

(54) CONTROL CIRCUIT OF POWER CONVERTING CIRCUIT, METHOD OF CONTROLLING POWER CONVERTING CIRCUIT AND RELATED POWER CONVERTING SYSTEM

(71) Applicant: ARK HDPS SEMICONDUCTOR PTE. LIMITED., Singapore (SG)

(72) Inventors: Yi-Lun Shen, Taipei (TW); Yu-Yun Huang, Taipei (TW)

(73) Assignee: Ark HDPS Semiconductor Pte. LIMITED., Singapore (SG)

( * ) Notice: Subject to any disclaimer, the term of this patent is extended or adjusted under 35 U.S.C. 154(b) by 186 days.

(21) Appl. No.: 18/516,906

(22) Filed: Nov. 21, 2023

(65) Prior Publication Data

US 2024/0258900 A1 Aug. 1, 2024

(30) Foreign Application Priority Data

Jan. 28, 2023 (CN) .......................... 202310042297.7

(51) Int. Cl.

| H02M 1/14 | (2006.01) |
|---|---|
| H02M 1/08 | (2006.01) |
| H02M 1/10 | (2006.01) |
| H02M 1/44 | (2007.01) |
| H02M 7/06 | (2006.01) |

(Continued)

(52) U.S. Cl.
CPC .............. *H02M 1/08* (2013.01); *H02M 1/10* (2013.01); *H02M 1/14* (2013.01); *H02M 1/44* (2013.01); *H02M 7/062* (2013.01); *H02M 7/217* (2013.01); *H05B 45/36* (2020.01)

(58) Field of Classification Search
CPC ............ H02M 1/08; H02M 1/10; H02M 1/14; H02M 1/44; H02M 1/32; H02M 1/007; H02M 7/217; H02M 7/062; H05B 45/36; Y02B 70/10

See application file for complete search history.

(56) References Cited

U.S. PATENT DOCUMENTS 5,561,596 A * 10/1996 Hemena ................... H02H 3/24
361/118
6,160,725 A 12/2000 Jansen
(Continued)

FOREIGN PATENT DOCUMENTS

| CN | 110062491 B | * 4/2022 | ............ H05B 45/50 |
|---|---|---|---|
| JP | 2003-323223 | 11/2003 | |

(Continued)

*Primary Examiner* — Monica Lewis
*Assistant Examiner* — Jye-June Lee
(74) *Attorney, Agent, or Firm* — Winston Hsu (57) ABSTRACT

A control circuit of a power conversion circuit includes an energy storing circuit coupled between an AC/DC rectifier circuit and a DC/DC conversion circuit. When a first condition "the absolute peak value of the input voltage of the AC/DC rectifying circuit is smaller than a reference voltage" is satisfied, discharge current is provided for lowering the voltage on the first output end of the AC/DC rectifying circuit. When the first condition and a second condition "the discharge current is smaller than reference current" are both satisfied, a switch of the energy storing circuit is turned on. When the first condition and the second are not both satisfied, the switch of the energy storing circuit is turned off.

20 Claims, 4 Drawing Sheets

(51) Int. Cl.
*H02M 7/217* (2006.01)
*H05B 45/36* (2020.01)

(56) References Cited

U.S. PATENT DOCUMENTS

| | | | |
|---|---|---|---|
| 8,796,884 B2 | 8/2014 | Naiknaware | |
| 9,602,009 B1* | 3/2017 | Bäurle | ................... H02M 7/06 |
| 10,638,562 B2* | 4/2020 | Huang | ................... H05B 45/36 |
| 2009/0103337 A1* | 4/2009 | Matthews | ............. H02M 7/217 |
| | | | 363/84 |
| 2010/0270949 A1 | 10/2010 | Onishi | |
| 2015/0077073 A1 | 3/2015 | Yu | |
| 2020/0205265 A1* | 6/2020 | Wang | ................... H05B 45/36 |
| 2024/0243670 A1* | 7/2024 | Chen | ................... H02M 7/217 |

FOREIGN PATENT DOCUMENTS

| | | | |
|---|---|---|---|
| JP | 2005006398 A * | 1/2005 | |
| TW | 201526498 A | 7/2015 | |
| TW | 202207589 A | 2/2022 | |

\* cited by examiner

CONTROL CIRCUIT OF POWER CONVERTING CIRCUIT, METHOD OF CONTROLLING POWER CONVERTING CIRCUIT AND RELATED POWER CONVERTING SYSTEM

BACKGROUND OF THE INVENTION

1. Field of the Invention

The present invention is related to an electronic device, and more particularly, to a control circuit of a power conversion circuit, a method of controlling the power conversion circuit and a power conversion system.

2. Description of the Prior Art

A common power conversion circuit includes an AC/DC rectifier circuit, a DC/DC conversion circuit, and an energy storing circuit coupled between the AC/DC rectifier circuit and the DC/DC conversion circuit. The energy storing circuit is used to reduce or even eliminate ripple voltage in the rectified voltage outputted by the AC/DC rectifier circuit.

In order to meet application requirements, such power conversion circuit requires an input voltage suitable for a certain range of the AC/DC rectifier circuit, that is, AC voltage. For example, the applicable input voltage range of the power conversion circuit is from 85V to 265V. For another example, the applicable input voltage range of the power conversion circuit is from 110V to 220V. In order to be suitable for the minimum input voltage, the overall capacitance value of the capacitors in the energy storing circuit needs to be sufficiently large. In order to be able to be suitable for the maximum input voltage, the overall rated voltage of the capacitors in the energy storing circuit (i.e., the maximum voltage it can withstand) also needs to be sufficiently large.

Since the size and the cost of a single capacitor increase with its rated voltage and its capacitance value, a prior art energy storing circuit includes two capacitors coupled in parallel for reducing the overall size and overall cost of the capacitors in the energy storing circuit. More specifically, these two capacitors in a parallel configuration include a capacitor with a larger voltage rating (usually referred to as a high-voltage capacitor) and a capacitor with a smaller voltage rating (usually referred to as a low-voltage capacitor). The low-voltage capacitor is coupled in series to a switch.

When the switch is turned off, only the high-voltage capacitor among the two capacitors in a parallel configuration is able to operate. Under such circumstance, the capacitors in the energy storing circuit have the largest overall rated voltage, and the energy storing circuit is suitable for a larger input voltage in the input voltage range (hereinafter referred to as high voltage, including the maximum input voltage) in the input voltage range.

When the switch is turned on, both the high-voltage capacitor and the low-voltage capacitor are able to operate. Under such circumstance, the capacitors in the energy storing circuit has the largest overall capacitance value, and the energy storing circuit is suitable for a smaller input voltage (hereinafter referred to as low voltage, including the minimum input voltage) in the input voltage range.

In other words, it is desirable to turn on the switch when the input voltage of the AC/DC rectifier circuit is at a low voltage level, and turn off the switch when the input voltage of the AC/DC rectifier circuit is at a high voltage level.

SUMMARY OF THE INVENTION

The present invention provides a control circuit of a power conversion circuit which includes an energy storing circuit coupled between an AC/DC rectifier circuit and a DC/DC conversion circuit. The AC/DC rectifier circuit includes a first output end and a second output end configured as ground. The energy storing circuit includes a first branch circuit and a second branch circuit coupled in parallel between the first output end and the second output end, wherein the first branch circuit includes a first capacitor, the second branch circuit includes a second capacitor and a switch coupled in series, and a rated voltage of the first capacitor is larger than a rated voltage of the second capacitor. The control circuit is configured to perform a predetermined operation when a first condition is satisfied, wherein the predetermined operation includes providing a discharge current which flows out of the first output end for lowering a first voltage established at the first output end; a value of the discharge current is positively correlated with a voltage difference between the first voltage and a first reference voltage; and the first condition is satisfied when an absolute peak value of an input voltage of the AC/DC rectifier circuit is smaller than a second reference voltage. The control circuit is further configured to control the switch to turn on when the first condition and a second condition are both satisfied, wherein the second condition is satisfied when the value of the discharge current is smaller than a reference current; and control the switch to turn off when at least one of the first condition and the second condition is not satisfied.

The present invention also provides a method of controlling a power conversion circuit which includes an energy storing circuit coupled between an AC/DC rectifier circuit and a DC/DC conversion circuit. The AC/DC rectifier circuit includes a first output end and a second output end configured as ground. The energy storing circuit includes a first branch circuit and a second branch circuit coupled in parallel between the first output end and the second output end, wherein the first branch circuit includes a first capacitor, the second branch circuit includes a second capacitor and a switch coupled in series, and a rated voltage of the first capacitor is larger than a rated voltage of the second capacitor. The method includes performing a predetermined operation when a first condition is satisfied, wherein the predetermined operation includes providing a discharge current which flows out of the first output end for lowering a first voltage established at the first output end; a value of the discharge current is positively correlated with a voltage difference between the first voltage and a first reference voltage; and the first condition is satisfied when an absolute peak value of an input voltage of the AC/DC rectifier circuit is smaller than a second reference voltage. The method further includes controlling the switch to turn on when the first condition and a second condition are both satisfied, wherein the second condition is satisfied when the value of the discharge current is smaller than a reference current; and controlling the switch to turn off when at least one of the first condition and the second condition is not satisfied.

The present invention also provides a power conversion system which includes a power conversion circuit and a control circuit. The power conversion circuit includes an AC/DC rectifier circuit which includes a first output end and a second output end configured as ground; a DC/DC conversion circuit; and an energy storing circuit coupled between the AC/DC rectifier circuit and the DC/DC conversion circuit, and comprising a first branch circuit and a second branch circuit coupled in parallel between the first output end and the second output end, wherein the first branch circuit includes a first capacitor, and the second branch circuit includes a second capacitor and a switch coupled in series, wherein a rated voltage of the first capacitor is larger than a rated voltage of the second capacitor. The control circuit is configured to perform a predetermined operation when a first condition is satisfied, control the switch to turn on when the first condition and a second condition are both satisfied, and control the switch to turn off when at least one of the first condition and the second condition is not satisfied, wherein the predetermined operation includes providing a discharge current which flows out of the first output end for lowering a first voltage established at the first output end; a value of the discharge current is positively correlated with a voltage difference between the first voltage and a first reference voltage; the first condition is satisfied when an absolute peak value of an input voltage of the AC/DC rectifier circuit is smaller than a second reference voltage; and the second condition is satisfied when the value of the discharge current is smaller than a reference current.

These and other objectives of the present invention will no doubt become obvious to those of ordinary skill in the art after reading the following detailed description of the preferred embodiment that is illustrated in the various figures and drawings.

DETAILED DESCRIPTION

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "under," "lower," "over," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" and/or "beneath" other elements or features would then be oriented "above" and/or "over" the other elements or features. The apparatus may be otherwise oriented (rotated 90 degrees or at other orientations) and the spatially relative descriptors used herein may likewise be interpreted accordingly.

It is understood that, although the terms first, second, third, etc. may be used herein to describe various elements, components, regions, layers and/or sections, these elements, components, regions, layers and/or sections should not be limited by these terms. These terms may be only used to distinguish one element, component, region, layer and/or section from another region, layer and/or section. Terms such as "first," "second," and other numerical terms when used herein do not imply a sequence or order unless clearly indicated by the context. Thus, a first element, component, region, layer and/or section discussed below could be termed a second element, component, region, layer and/or section without departing from the teachings of the embodiments. As disclosed herein, the term "about" or "substantial" generally means within 20%, 10%, 5%, 3%, 2%, 1%, or 0.5% of a given value or range. Unless otherwise expressly specified, all of the numerical ranges, amounts, values and percentages disclosed herein should be understood as modified in all instances by the term "about" or "substantial". Accordingly, unless indicated to the contrary, the numerical parameters set forth in the present disclosure and attached claims are approximations that can vary as desired.

Furthermore, as disclosed herein, the terms "coupled to" and "electrically connected to" include any directly and indirectly electrical connecting means. Therefore, if it is described in this document that a first component is coupled or electrically connected to a second component, it means that the first component may be directly connected to the second component, or may be indirectly connected to the second component through other components or other connecting means.

Although the disclosure is described with respect to specific embodiments, the principles of the disclosure, as defined by the claims appended herein, can obviously be applied beyond the specifically described embodiments of the disclosure described herein. Moreover, in the description of the present disclosure, certain details have been left out in order to not obscure the inventive aspects of the disclosure. The details left out are within the knowledge of a person having ordinary skill in the art.

The input voltage of the AC/DC rectifier circuit may fluctuate between a high voltage level and a low voltage level when encountering voltage instability. Under such circumstance, the output voltage of the AC/DC rectifier circuit may decrease later than the input voltage of the AC/DC rectifier circuit. In order to prevent the low-voltage capacitor from being punched through, the prior art AC/DC rectifier circuit controls the switch to turn on only after its output voltage drops to a low voltage level which the low-voltage capacitor can withstand in a delayed manner. In this prior art control method, the switch may not be turned on in time when the input voltage of the AC/DC rectifier circuit fluctuates from a high voltage level to a low voltage level. Under such circumstance, the overall capacitance value of the capacitors in the energy storing circuit may not be adjusted to its maximum value in time, thereby resulting in larger ripple voltages in the output voltage of the energy storing circuit. Such ripple voltages not only lower the conversion efficiency of the DC/DC conversion circuit at the next stage, but also generate larger noise interferences to other electronic devices.

The present invention is therefore aimed at solving the above-mentioned issues.

Figure 1:
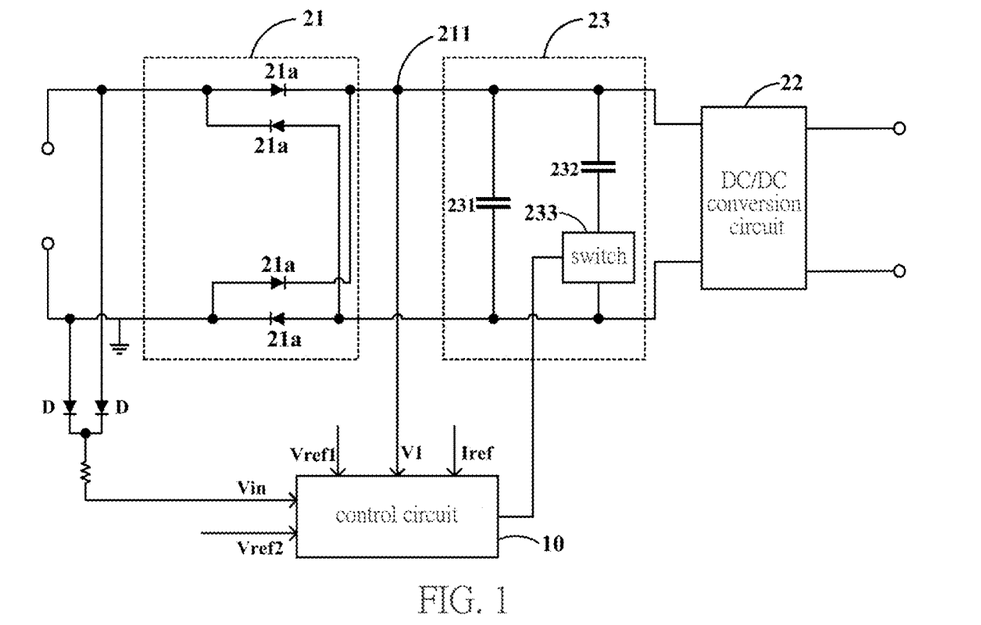
FIG. 1 is a diagram illustrating a power conversion system according to an embodiment of the present invention.

FIG. 1 is a diagram illustrating a power conversion system according to an embodiment of the present invention. As depicted in FIG. 1, the power conversion system includes a power conversion circuit and a control circuit 10 of the power conversion circuit. The power conversion circuit includes an energy storing circuit 23 coupled between an AC/DC rectifier circuit 21 and a DC/DC conversion circuit 22. The AC/DC rectifier circuit 21 includes a first output end 211 and a second output end configured as ground.

In some embodiments, the power conversion circuit further includes the AC/DC rectifier circuit 21. The AC/DC rectifier circuit 21 includes one or multiple rectifier devices 21a. For example, the AC/DC rectifier circuit 21 may be a bridge rectifier circuit 21 which includes four rectifier devices 21a. Each rectifier device 21a may be a diode or a metal-oxide-semiconductor field-effect transistor (MOSFET). However, the implementation of the AC/DC rectifier circuit 21 does not limit the scope of the present invention.

In some other embodiments, the power conversion circuit further includes the DC/DC conversion circuit 22. For example, the DC/DC conversion circuit 22 includes a switching power supply (SPS) circuit. The energy storing circuit 13 includes a first branch circuit and a second branch circuit coupled in parallel between the first output end 211 and the second output end of the AC/DC rectifier circuit 21. The first branch circuit includes a first capacitor 231, and the second branch circuit includes a second capacitor 231 and a switch 233 coupled in series. The switch 233 may be a MOSFET, such as an N-type MOSFET or a P-type MOSFET, but is not limited thereto.

In some embodiments, the rated voltage of the first capacitor 231 (i.e., the maximum operating voltage that the first capacitor 231 can withstand) is larger than the rated voltage of the second capacitor 232 (i.e., the maximum operating voltage that the second capacitor 232 can withstand). In other words, the first capacitor 231 is a high-voltage capacitor and the second capacitor 232 is a low-voltage capacitor, relatively speaking. For example, the size of the first capacitor 231 is typically larger than the size of the second capacitor 232, and the cost of the first capacitor 231 is typically larger than the cost of the second capacitor 232.

In some embodiments, the capacitance value of the first capacitor 231 is smaller than or essentially equal to the capacitance value of the second capacitor 232. For example, the capacitance value of the first capacitor 231 is equal to a smaller capacitance value suitable for the first capacitor 231 when the input voltage of the AC/DC conversion circuit 21 is at a high voltage level, and the capacitance value of the second capacitor 232 is equal to an extra increased amount of capacitance value suitable for the second capacitor 232 when the input voltage of the AC/DC conversion circuit 21 is at a low voltage level. The ratio of the capacitance value of the first capacitor 231 to the capacitance value of the second capacitor 232 is 1:1 or 1:2, thereby capable of reducing the overall size and overall cost of the first capacitor 231 and the second capacitor 232.

It is to be understood that the power conversion circuit requires an input voltage suitable for a certain range of the AC/DC rectifier circuit, that is, AC voltage. Therefore, the first capacitor 231 needs to be able to withstand the maximum input voltage and the second capacitor 232 needs to be able to withstand the minimum input voltage. For example, the maximum input voltage suitable for the power conversion circuit is smaller than or equal to the rated voltage of the first capacitor 231, and the minimum input voltage suitable for the power conversion circuit is smaller than or equal to the rated voltage of the second capacitor 232.

In some embodiments, the control circuit 10 of the power conversion circuit is configured to perform a predetermined operation when a first condition is satisfied. The first condition is satisfied when the absolute peak value of an input voltage Vin of the AC/DC rectifier circuit 21 is smaller than a second reference voltage Vref2.

For example, the control circuit 10 may be coupled to the input end of the AC/DC rectifier circuit 21 for acquiring the input voltage Vin of the AC/DC rectifier circuit 21. As depicted in FIG. 1, the control circuit 10 may be coupled to the input end of the AC/DC rectifier circuit 21 via a rectifier device D for acquiring the absolute value of the input voltage Vin of the AC/DC rectifier circuit 21.

When the first condition is satisfied, it indicates that the input voltage Vin of the AC/DC rectifier circuit 21 is at a low voltage level. For example, the first condition is satisfied when the input voltage Vin of the AC/DC rectifier circuit 21 drops to a low voltage level from a high voltage level. In response, the control circuit 10 is configured to perform the predetermined operation.

In some embodiments, the predetermined operation includes converting the voltage difference between a first voltage V1 established at the first output end 211 and a first reference voltage Vref1 into a discharge current whose value is positively correlated with the voltage difference, wherein the discharge current flows out of the first output end 211 for lowering the first voltage V1. It is to be understood that the voltage difference between the first voltage V1 and the first reference voltage Vref1 is equal to the first voltage V1 minus the first reference voltage Vref1.

In some embodiments, the predetermined operation includes providing a discharge current which flows out of the first output end 211 for accelerating the decrease of the first voltage V1 established at the first output end 211. The value of the discharge current is positively correlated with the voltage difference between the first voltage V1 and the first reference voltage Vref1.

In other words, by executing each of the above-mentioned two types predetermined operations, a discharge current whose value is positively correlated with the voltage difference between the first voltage V1 established at the first output end 211 and the first reference voltage Vref1 may be provided and controlled to flow out of the first output end 211, thereby accelerating the decrease of the first voltage V1 established at the first output end 211.

In is to be understood that the first reference voltage Vref1 is essentially equal to or smaller than the first voltage V1. For example, the first reference voltage Vref1 is essentially equal to the absolute peak value of the input voltage Vin when the input voltage Vin is at a low voltage level. This way, the value of the discharge current increases with the first voltage V1, thereby allowing the first voltage to decrease faster, and vice versa.

For example, after the input voltage Vin of the AC/DC rectifier circuit 21 drops to a low voltage level from a high voltage level and remains at the low voltage level, the first voltage V1 established at the first output end 211 also decreases with the input voltage Vin. Also, since the first condition is satisfied, the control circuit 10 is configured to perform the predetermined operation so that the discharge current flows out of the first output end 211. Under such circumstance, the first voltage V1 may be lowered at a faster speed, thereby allowing the first voltage V1 to drop to a voltage that the second capacitor 232 can withstand (such as drop to the first reference voltage Vref1) more rapidly.

The control circuit 10 is further configured to control the switch 233 to turn on when the first condition and a second condition are both satisfied, and control the switch 233 to turn off when at least one of the first condition and the second condition is not satisfied. The second condition is satisfied when the value of the discharge current is smaller than a reference current Iref.

When the second condition is satisfied, it indicates that the voltage difference between the first voltage V1 and the reference voltage Vref1 is sufficiently small. That is, the first voltage V1 has rapidly dropped to a voltage that the second capacitor 232 can withstand. Under such circumstance, the control circuit 10 is configured to control the switch 233 to turn on when the first condition is also satisfied.

In the above-mentioned embodiments when the absolute peak value of the input voltage Vin of the AC/DC rectifier circuit 21 is smaller than the second reference voltage Vref2, the control circuit 10 is configured to perform the predetermined operation so that the discharge current having a value positively correlated with the voltage difference between the first voltage V1 and the first reference voltage Vref1 may flow out of the first output end 211, thereby lowering the first voltage V1 at a faster speed. After that, in the situation when the discharge current is smaller than the reference current Iref and the absolute peak value of the input voltage Vin of the AC/DC rectifier circuit 21 remains smaller than the second reference voltage Vref2, the control circuit 10 is configured to control the switch 233 to turn on. This way, the switch 233 may be turned on in time when the input voltage Vin of the AC/DC rectifier circuit 21 fluctuates from a high voltage level to a low voltage level. Under such circumstance, the overall capacitance value of the capacitors in the energy storing circuit 23 may be adjusted to its maximum value in time, thereby reducing ripple voltages in the output voltage of the energy storing circuit 23. Therefore, the present invention not only improves the conversion efficiency of the DC/DC conversion circuit 22, but also reduces noise interferences to other electronic devices.

Also, in the situation when the discharge current is not smaller than the reference current Iref or the absolute peak value of the input voltage Vin of the AC/DC rectifier circuit 21 is not smaller than the second reference voltage Vref2, the control circuit 10 is configured to control the switch 233 to turn off. This way, the switch 233 may be turned on in time when the input voltage Vin of the AC/DC rectifier circuit 21 fluctuates from a high voltage level to a low voltage level. This way, the present invention not only reduces the possibility of the second capacitor 232 being punched through by the high voltage, but also improves the reliability of the power conversion circuit.

Figure 2:
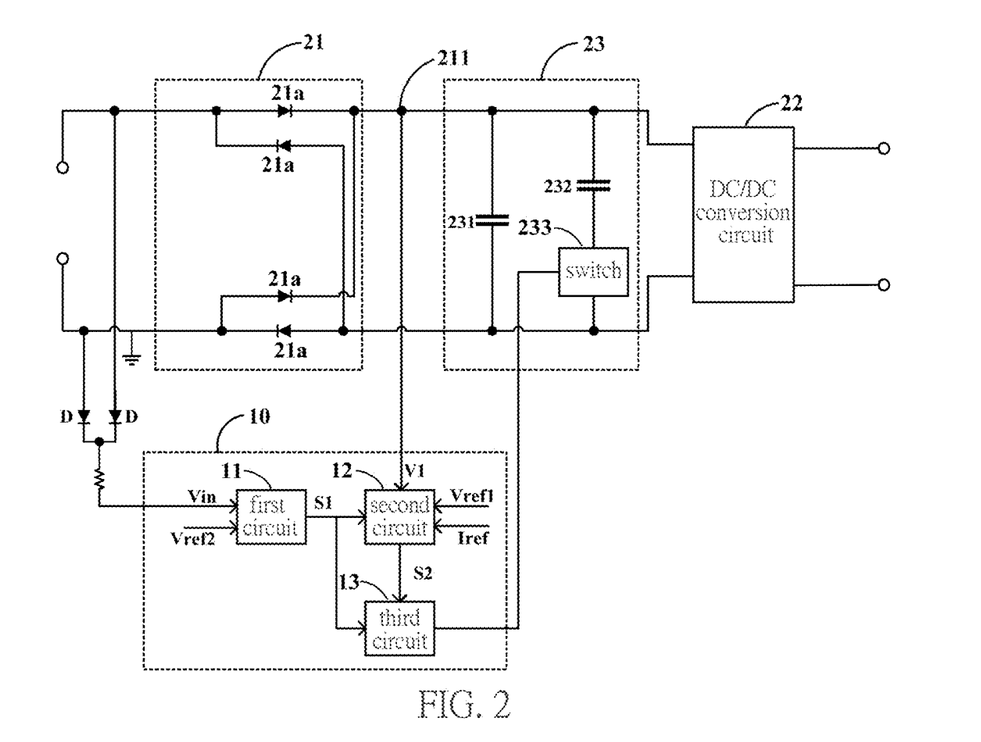
FIG. 2 is a diagram illustrating a power conversion system according to another embodiment of the present invention.

FIG. 2 is a diagram illustrating a power conversion system according to another embodiment of the present invention. The implementation of the control circuit 10 will be described with reference to FIG. 2.

As depicted in FIG. 2, the control circuit 10 includes a first circuit 11, a second circuit 12, and a third circuit 13. The first circuit 11 is configured to determine whether the first condition is satisfied based on the input voltage Vin of the AC/DC rectifier circuit 21 and the second reference voltage Vref2. The first circuit 11 is configured to output a first signal S1 when determining that the first condition is satisfied.

In some embodiments, the first circuit 11 is further configured to output a signal having an opposite logic level with respect to the first signal S1 when determining that the first condition is not satisfied. For example, the first signal S1 is at a high voltage level. For another example, the first signal S1 is at a low voltage level.

The second circuit 12 is coupled to the first output end 211 of the AC/DC rectifier circuit 21 and the first circuit 11. The second circuit 12 is configured to perform the predetermined operation when receiving the first signal S1 and output a second signal S2 when determining that the second condition is satisfied.

In some embodiments, the second circuit 12 is further configured to output a signal having an opposite logic level with respect to the second signal S2 when determining that the second condition is not satisfied. For example, the second signal S2 is at a high voltage level. For another example, the second signal S2 is at a low voltage level.

The third circuit 13 is configured to control the switch 233 to turn on when receiving both the first signal S1 and the second signal S2. The third circuit 13 is configured to control the switch 233 to turn off when unable to receive at least one of the first signal S1 and the second signal S2.

In some embodiments, the first signal S1 and the second signal S2 are both at a high voltage level. Under such circumstance, the third circuit 13 may include an AND gate circuit. The AND gate circuit is configured to output a high level signal for turning on the switch 233 when receiving the first signal S1 and the second signal S2 both at a high voltage level. The AND gate circuit is configured to output a low level signal for turning off the switch 233 when unable to receive at least one of the first signal S1 at a high voltage level and the second signal S2 at a high voltage level.

Figure 3:
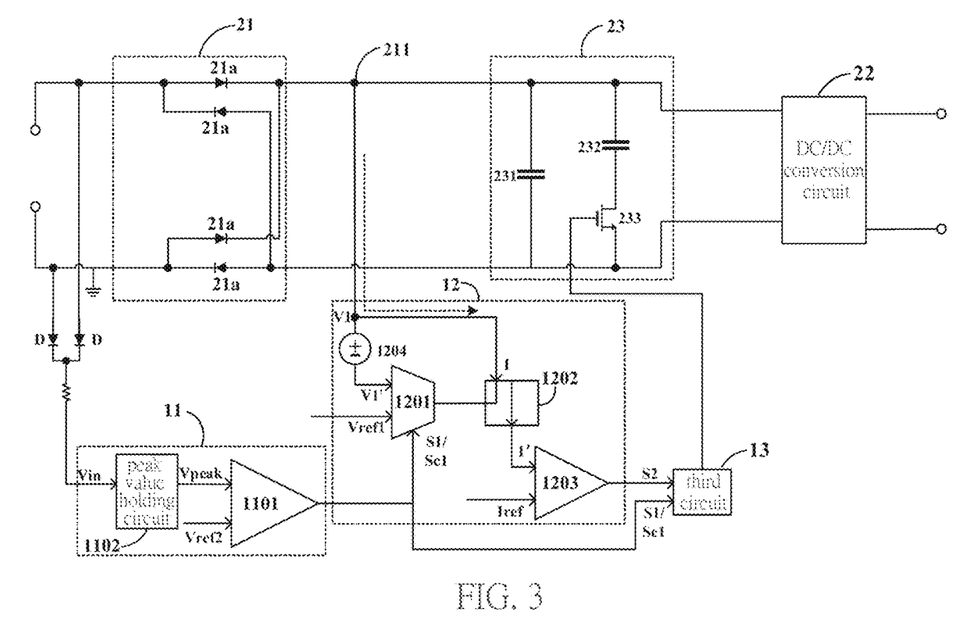
FIG. 3 is a diagram illustrating a power conversion system according to another embodiment of the present invention.
Figure 4:
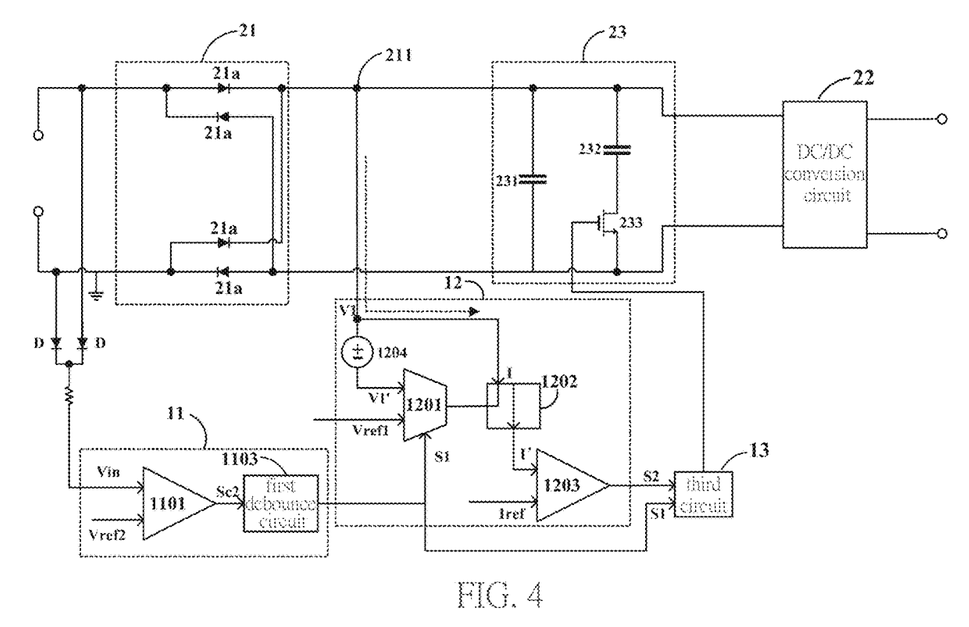
FIG. 4 is a diagram illustrating a power conversion system according to another embodiment of the present invention.

FIGS. 3 and 4 are diagrams illustrating power conversion systems according to other embodiments of the present invention. The implementation of the first circuit 11 and the second circuit 12 will be described with reference to FIGS. 3 and 4.

Regarding the implementation of the first circuit 11 as depicted in FIG. 3, the first circuit 11 includes a first comparator 1101 configured to compare the input voltage Vin of the AC/DC rectifier circuit 21 or the absolute peak value of the input voltage Vin with the second reference voltage Vref2, thereby outputting a corresponding compare signal. For example, the first comparator 1101 is configured to compare the absolute peak value Vpeak of the input voltage Vin of the AC/DC rectifier circuit 21 with the second reference voltage Vref2, thereby outputting a first compare signal Sc1. For another example, the first comparator 1101 is configured to compare the input voltage Vin of the AC/DC rectifier circuit 21 with the second reference voltage Vref2, thereby outputting a second compare signal Sc2. In some embodiments, the first comparator 1101 is coupled to the input end of the AC/DC rectifier circuit 21 via a rectifier device D. Under such circumstance, the first comparator 1101 is configured to compare the absolute value of the input voltage Vin with the second reference voltage Vref2, thereby outputting the second compare signal Sc2.

The first circuit 11 is configured to output the first signal S1 based on the compare signal outputted by the first comparator 1101. This way, the first circuit 11 may output the first signal S1 when the first condition is satisfied.

In the embodiment depicted in FIG. 3, the first comparator 1101 is configured to compare the absolute peak value Vpeak of the input voltage Vin of the AC/DC rectifier circuit 21 with the second reference voltage Vref2. The first comparator 1101 is configured to provide the first signal by outputting the first compare signal Sc1 as the first signal S1 when the absolute peak value Vpeak is smaller than the second reference voltage Vref2

In some embodiments, the first circuit 11 may further includes a peak value holding circuit 1102 configured to output the absolute peak voltage Vpeak of the input voltage Vin of the AC/DC rectifier circuit 21 based on the input voltage Vin of the AC/DC rectifier circuit 21, so that the first comparator 1101 is able to compare the absolute peak voltage Vpeak with the second reference voltage Vref2.

In the embodiment depicted in FIG. 4, the first comparator 1101 is configured to compare the input voltage Vin of the AC/DC rectifier circuit 21 with the second reference voltage Vref2. The first comparator 1101 is configured to output the second compare signal Sc2 when the input voltage Vin is larger than or equal to the second reference voltage Vref2.

Under such circumstance, the first circuit 11 further includes a debounce circuit (hereafter as a first debounce circuit) 1103 configured to output the first signal S1 when the second compare signal Sc2 is not received for a first predetermined period (i.e., there is no second compare signal Sc2 generated and received by the debounce circuit 1103 during a time duration longer than the first predetermined time period). In an embodiment, the first predetermined period is longer than or equal to the period of the input voltage Vin of the AC/DC rectifier circuit 21.

When the first debounce circuit 1103 is unable to receive the second compare signal Sc2 within the first predetermined period, it indicates that the input voltage Vin of the AC/DC rectifier circuit 21 remains smaller than the second reference voltage Vref2 within one period. Under such circumstance, the first condition is satisfied, and the first debounce circuit 1103 is configured to output the first signal S1.

In this embodiment, by directly comparing the input voltage Vin of the AC/DC rectifier circuit 21 with the second reference voltage Vref2, the first comparator 1101 is able to output the first signal S1 when the first condition is satisfied without processing the input voltage Vin of the AC/DC rectifier circuit 21 using any extra circuit (such as a peak value holding circuit). This way, the internal structure of the first circuit 11 may be simplified for reducing the size and the cost of the control circuit 10.

In some embodiment, the first predetermined period is shorter than or essentially equal to 1.25 times the period of the input voltage Vin of the AC/DC rectifier circuit 21. For example, the first predetermined period is equal to the period of the input voltage Vin of the AC/DC rectifier circuit 21. For another example, the first predetermined period is equal to 1.1 or 1.2 times the period of the input voltage Vin of the AC/DC rectifier circuit 21.

In these embodiments, the present invention can accurately determine when the input voltage Vin of the AC/DC rectifier circuit 21 drops to a low voltage level, and is able to output the first signal S1 in time when the input voltage Vin of the AC/DC rectifier circuit 21 drops to the low voltage level so that the second circuit 12 can perform the predetermined operation in time.

In these embodiments, the control circuit 10 is able to control the switch 233 to turn on in time when the input voltage Vin of the AC/DC rectifier circuit 21 fluctuates from a high voltage level to a low voltage level. This way, the overall capacitance value of the capacitors in the energy storing circuit 23 may be adjusted to its maximum value in time, thereby improving the conversion efficiency of the DC/DC conversion circuit 22 and reducing noise interferences to other electronic devices.

Regarding the implementation of the second circuit 12 as depicted in FIGS. 3 and 4, the second circuit 12 includes an operational transconductance amplifier 1201, a current mirror circuit 1202 and a second comparator 1203. The operational transconductance amplifier 1201 is coupled to the first output end 211 of the AC/DC rectifier circuit 21. The current mirror circuit 1202 is coupled to the first output end 211 and the operational transconductance amplifier 1201. The second comparator 1203 is coupled to the current mirror circuit 1202.

The operational transconductance amplifier 1201 is configured to convert the voltage difference between the first voltage V1 and the first reference voltage Vref1 into the discharge current I when receiving the first signal S1. The discharge current flows out of the first output end 211 for accelerating the decrease of the first voltage V1. For example, the operational transconductance amplifier 1201 is coupled to the first output end 211 for acquiring the first voltage V1 established on the first output end 211, and control the value of the discharge current flowing out of the first output end 211 to be positively correlated with the voltage difference between the first voltage V1 and the first reference voltage Vref1 based on the voltage difference.

The current mirror circuit 1202 is configured to output a mirror current I' of the discharge current I. The second comparator 1203 is configured to compare the mirror current I' with the reference current Iref, and output the second signal S2 when the mirror current I' is smaller than the reference current Iref. It is to be understood that the second comparator 1203 does not output the second signal S2 when the mirror current I' is not smaller than the reference current Iref. This way, the second circuit 12 may perform the predetermined operation when the first condition is satisfied and may output the second signal S2 when the second condition is satisfied.

In the embodiments depicted in FIGS. 3 and 4, the operational transconductance amplifier 1201 is coupled to the first output end 211 of the AC/DC rectifier circuit 21 via a DC voltage source 1204. The DC voltage source 1204 is configured to provide an offset voltage Vos. The first voltage V1 becomes a voltage V1' after pass the DC voltage source 1204, wherein the value of the voltage V1' is equal to the sum of the first voltage V1 and the offset voltage Vos or the difference between the first voltage V1 and the offset voltage Vos.

In these embodiments, the operational transconductance amplifier 1201 is configured to control the discharge current I flowing out of the first output end 211 based on the voltage difference between the voltage V1' and the first reference voltage Vref1. By disposing the DC voltage source 1204 between the first output end 211 and the operational transconductance amplifier 1201 for providing the offset voltage Vos, the value of the discharge current I may be guaranteed to be 0 A when the voltage V1' is equal to the first reference voltage Vref1. This way, the present invention can prevent the discharge current I from continuing to flow out of the first output end 211 after the voltage V1' drops to the first reference voltage Vref1. Therefore, the present invention can prevent the voltage V1' from continuing to be discharged to the first output end 211 after dropping to the first reference voltage Vref1, thereby guaranteeing the reliability of power conversion.

The operational transconductance amplifier 1201 is configured to operate when the input voltage Vin of the AC/DC rectifier circuit 21 is at a low voltage level and the first condition is satisfied. In some embodiments, the first reference voltage Vref1 may be equal to the peak voltage Vpeak of the input voltage Vin of the AC/DC rectifier circuit 21 at the low voltage level. This way, the present invention can present the voltage V1' from continuing to be discharged to the first output end 211 after dropping to the peak voltage Vpeak, thereby avoiding insufficiency power output from the power conversion circuit to the load.

In some embodiments, the first reference voltage Vref1 is equal to the peak voltage Vpeak outputted by the peak value holding circuit 1102. This way, the predetermined operation may be performed based on the existing peak voltage Vpeak in the control circuit 10 instead of using an extra power source for providing the first reference voltage Vref1, thereby simplifying the circuit structure of the control circuit 10.

In some embodiments, the value of the voltage V1' is equal to the difference between the first voltage V1 and the offset voltage Vos. For example, the voltage V1' is equal to 154V (i.e., the peak voltage Vpeak of the input voltage Vin at the low voltage level) and the offset voltage Vos is equal to 10V. Under such circumstance, when the voltage V1' is equal to 164V, the voltage V' is equal to 154V (i.e., the reference voltage Vref1). In other words, the first voltage V1 stops to be discharged to the first output end 211 when its value reaches 164V. After that, the value of the first voltage V1 only decreases automatically and slowly in response to the input voltage Vin smaller than the first voltage V1 instead of dropping rapidly due to the discharge current I. This way, the first voltage V1 may stop to be discharged to the first output end 211 when its value is slightly larger than the first reference voltage Vref1, thereby preventing the first voltage V1 from dropping to a value smaller than the peak voltage Vpeak more effectively.

Figure 5:
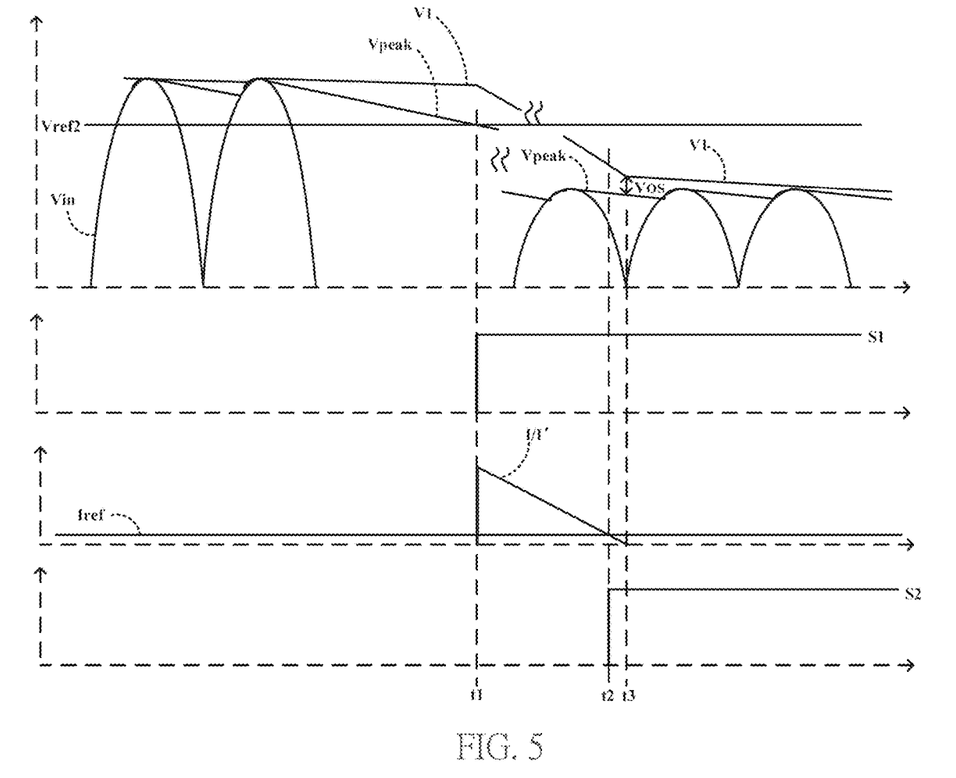
FIG. 5 is a diagram illustrating the signal waveforms when operating a power conversion system according to another embodiment of the present invention.

FIG. 5 is a diagram illustrating the signal waveforms when operating a power conversion system according to another embodiment of the present invention. The implementation of the embodiments of the present invention will be explained with reference to FIG. 5 in subsequent paragraphs.

As depicted in FIG. 5, before the time point t1, the absolute peak value of the input voltage Vin of the AC/DC rectifier circuit 21 is not smaller than the second reference voltage Vref2, and the first condition is thus not satisfied. The value of the input voltage Vin of the AC/DC rectifier circuit 21 decreases before the time point t1 and reaches the second reference voltage Vref2 at the time point t1. After the time point t1, the value of the input voltage Vin of the AC/DC rectifier circuit 21 continues to decrease so that the absolute peak value of the input voltage Vin of the AC/DC rectifier circuit 21 is smaller than the second reference voltage Vref2. Under such circumstance, since the first condition is satisfied, the first circuit 11 is configured to output the first signal S1, and the control circuit 10 is configured to perform the predetermined operation so that the discharge current I flows out of the first output end 211, thereby lowering the first voltage V1 rapidly.

Between the time points t1 and t2, the first voltage V1 decreases rapidly and the discharge current I continues to decrease, wherein the second condition is not satisfied since the discharge current I is larger than the reference current Iref. At the time point t2, the discharge current I becomes equal to the reference current Iref. After the time point t2, the discharge current I continues to decrease so that the discharge current I becomes smaller than the reference current Iref. Under such circumstance, since the second condition is satisfied, the second circuit 12 is configured to output the second signal S2, and the control circuit 10 is configured to turn on the switch 233.

At the time point t3, the voltage difference between the first voltage V1 and the peak voltage Vpeak (serving as the first reference voltage Vref1) is equal to the offset voltage Vos, which means that the voltage V1' is equal to the peak voltage Vpeak and the discharge current I is equal to 0 A. After the time point t3, the discharge current I remains at 0 A, and the first voltage V1 gradually decreases to the peak voltage Vpeak instead of rapidly dropping. Under such circumstance, the first condition and the second condition are both satisfied, and the switch 233 remains turned on.

The operation of the control circuit 10 is described in the following embodiments.

In some embodiments, the second condition is satisfied when the value of the discharge current I is smaller than the reference current Iref and when the value of the discharge current I remains smaller than the reference current Iref longer than or equal to a second predetermined period. For example, the second condition is not satisfied when the value of the discharge current I is smaller than the reference current Iref but the value of the discharge current I remains smaller than the reference current Iref shorter than the second predetermined period. Under such circumstance, the control circuit 10 is configured to turn off the switch 233 instead of turning on the switch 233.

In these embodiments, the control circuit 10 is configured to turn off the switch 233 when the value of the discharge current I is larger than or equal to the reference current Iref and when the value of the discharge current I remains larger than or equal to the reference current Iref longer than or equal to the second predetermined period. For example, when the value of the discharge current I is larger than or equal to the reference current Iref but the value of the discharge current I remains larger than or equal to the reference current Iref shorter than the second predetermined period, the control circuit 10 is configured to turn on the switch 233 instead of turning off the switch 233.

For illustrative purposes, the following embodiments are used to explain the present invention.

The input voltage Vin of the AC/DC rectifier circuit 21 may 21 may fluctuate from a high voltage level to a low voltage level when encountering voltage instability. Under such circumstance, the first condition is satisfied, and the control circuit 10 is configured to control the discharge current I to flow out of the first output end 211. After a while, the discharge current I becomes smaller than the reference current Iref. However, if voltage instability is still present, the input voltage Vin of the AC/DC rectifier circuit 21 may 21 may fluctuate from a low voltage level to a high voltage. If the switch 233 is turned on when the discharge current I just drops below the reference current Iref, the control circuit 10 is configured to turn off the switch 233 once the input voltage Vin of the AC/DC rectifier circuit 21 fluctuates from a low voltage level to a high voltage. This results in meaningless frequent switching of the switch 233, thereby increasing the malfunction possibility of the switch 233 and lowering the reliability of the power conversion circuit.

For another example, in the case when the input voltage Vin of the AC/DC rectifier circuit 21 starts at a low voltage level, the first condition and the second condition are both satisfied, and the switch 233 is turned on. However, if voltage instability is present, the input voltage Vin of the AC/DC rectifier circuit 21 may fluctuate from a low voltage level to a high voltage briefly and then drops back to a low voltage. During the period when the input voltage Vin of the AC/DC rectifier circuit 21 is at a high voltage level, the first voltage V1 increases so that the discharge current I is no longer smaller than the reference current Iref. If the switch 233 is turned off when the discharge current I just becomes larger than the reference current Iref, the control circuit 10 is configured to turn on the switch 233 once the input voltage Vin of the AC/DC rectifier circuit 21 fluctuates from a high voltage level to a low voltage. This results in meaningless frequent switching of the switch 233, thereby increasing the malfunction possibility of the switch 233 and lowering the reliability of the power conversion circuit.

In the above-mentioned embodiments, the control circuit 10 is configured to turn on the switch 233 when the value of the discharge current I is smaller than the reference current Iref and when the value of the discharge current I remains smaller than the reference current Iref longer than or equal to the second predetermined period. Also, the control circuit 10 is configured to turn off the switch 233 when the value of the discharge current I is larger than or equal to the reference current Iref and when the value of the discharge current I remains larger than or equal to the reference current Iref longer than or equal to the second predetermined period. This way, the present invention can prevent meaningless frequent switching of the switch 233, thereby reducing the malfunction possibility of the switch 233 and increasing the reliability of the power conversion circuit.

Figure 6:
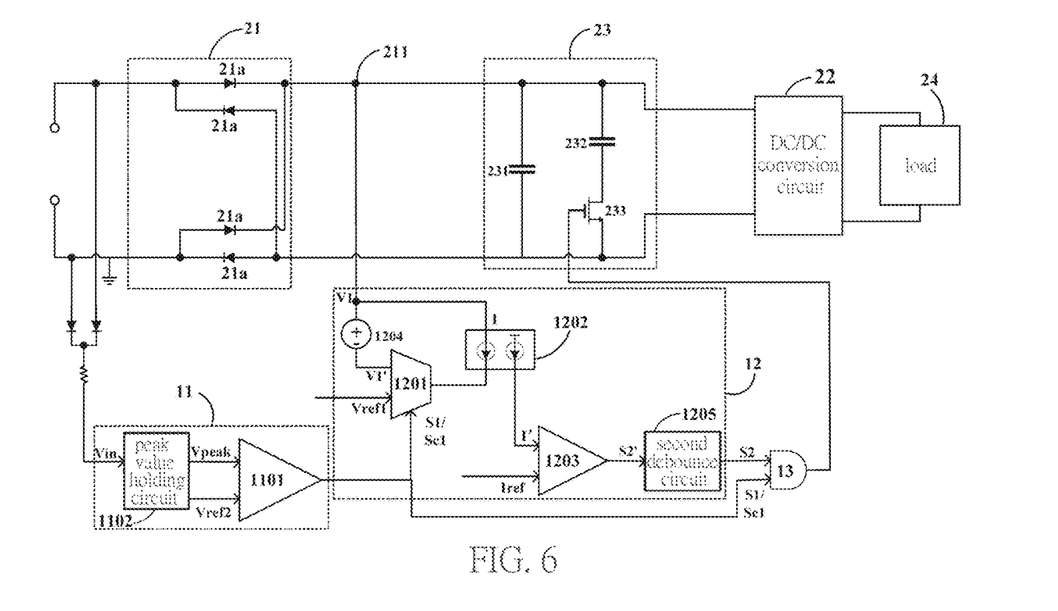
FIG. 6 is a diagram illustrating a power conversion system according to another embodiment of the present invention.

FIG. 6 is a diagram illustrating a power conversion system according to another embodiment of the present invention. The implementation of the embodiment of the second circuit 10 is described with reference to FIG. 6 in the subsequent paragraphs. In the embodiment depicted in FIG. 6, the third circuit 13 is schematically shown as an AND gate circuit, a load 24 of the power conversion circuit is schematically shown, wherein the load 24 may 24 may be any electronic device including, but not limited to, a smart phone or a computer.

As depicted in FIG. 6, the second circuit 12 may further include a debounce circuit (hereafter as a second debounce circuit) 1205 configured to output a sub signal S2' when the mirror current I' is smaller than the reference current Iref, and output a signal having an opposite logic level with respect to the sub signal S2' when the mirror current I' is larger than or equal to the reference current Iref. For example, the sub signal S2' is at a high voltage level. For another example, the sub signal S2' is at a low voltage level.

When continuing to receive the sub signal S2' within the second predetermined period, the second debounce circuit 1205 is configured to output the second signal S2 so that the third circuit 13 may turn on the switch 233. On the other hand, when continuing to receive the signal having an opposite logic level with respect to the sub signal S2' within the second predetermined period, the second debounce circuit 1205 is configured to output a signal having an opposite logic level with respect to the second signal S2 so that the third circuit 13 may turn off the switch 233.

This way, the control circuit 10 may turn on the switch 233 when the value of the discharge current I is smaller than the reference current Iref and when the value of the discharge current I remains smaller than the reference current Iref longer than or equal to the second predetermined period. Also, the control circuit 10 may turn off the switch 233 when the value of the discharge current I is larger than or equal to the reference current Iref and when the value of the discharge current I remains larger than or equal to the reference current Iref longer than or equal to the second predetermined period.

Figure 7:
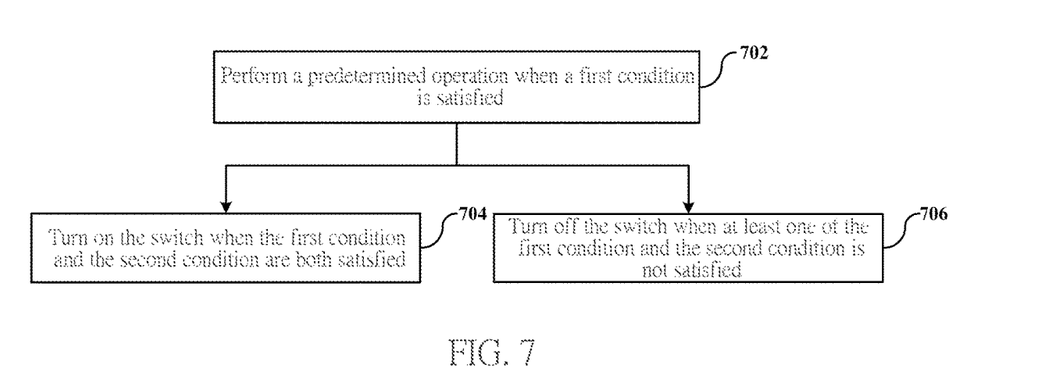
FIG. 7 is a flowchart illustrating a method of controlling a power conversion circuit according to an embodiment of the present invention.

FIG. 7 is a flowchart illustrating a method of controlling the power conversion circuit according to an embodiment of the present invention. The power conversion circuit includes an energy storing circuit 23 coupled between an AC/DC rectifier circuit 21 and a DC/DC conversion circuit 22. The AC/DC rectifier circuit 21 includes a first output end 2110 and a second output end configured as ground. The energy storing circuit 23 includes a first branch circuit and a second branch circuit coupled in parallel between the first output end 211 and the second output end. The first branch circuit includes a first capacitor 231, and the second branch circuit includes a second capacitor 232 and a switch 233 coupled in series, wherein the rated voltage of the first capacitor 231 is larger than the rated voltage of the second capacitor 232.

As depicted in FIG. 7, the present method of controlling the power conversion circuit includes steps 702-706. In step 702, a predetermined operation is performed when the first condition is satisfied. The first condition is satisfied when the absolute peak value of the input voltage Vin of the AC/DC rectifier circuit 21 is smaller than the second reference voltage Vref2.

In some embodiments, the predetermined operation includes converting the voltage difference between the first voltage V1 at the first output end 211 and the first reference voltage Vref1 into the discharge current I whose value is positively correlated with the voltage difference between the first voltage V1 and the first reference voltage Vref1. The discharge current I flows out of the first output end 211 for lowering the first voltage V1.

In some other embodiments, the predetermined operation includes providing a discharge current I which flows out of the first output end 211 for accelerating the decrease of the first voltage V1 at the first output end 211. The value of the discharge current I is positively correlated with the voltage difference between the first voltage V1 and the first reference voltage Vref1.

In step 704, the switch 233 is configured to turn on when the first condition and the second condition are both satisfied. The second condition is satisfied when the value of the discharge current I is smaller than the reference current Iref.

In step 706, the switch 133 is configured to turn off when at least one of the first condition and the second condition is not satisfied. This way, the switch 233 may be turned on in time when the input voltage Vin of the AC/DC rectifier circuit 21 fluctuates from a high voltage level to a low voltage level so that the overall capacitance value of the capacitors in the energy storing circuit 23 may be adjusted to its maximum value in time, thereby effectively reducing ripple voltages in the output voltage of the energy storing circuit 23. Therefore, the present invention can improve the conversion efficiency of the DC/DC conversion circuit 22 and reduce noise interferences to other electronic devices.

In some embodiments, the second condition is satisfied when the value of the discharge current I is smaller than the reference current Iref and further when the value of the discharge current I remains smaller than the reference current Iref longer than or equal to the second predetermined period. Under such circumstance, the switch 233 is turned off in step 706 when the value of the discharge current I is larger than or equal to the reference current Iref and when the value of the discharge current I remains larger than or equal to the reference current Iref longer than or equal to the second predetermined period. This way, the present invention can prevent meaningless frequent switching of the switch 233 when encountering voltage instability, thereby reducing the malfunction possibility of the switch 233 and increasing the reliability of the power conversion circuit.

It is to be understood that the above-mentioned method of controlling the power conversion may further include any step which is performed during the operation of the control circuit 10 in any of the above-mentioned embodiment. Similar information will not be repeated.

An embodiment of the present invention further provides a power conversion system. As depicted in FIGS. 1-4 and 6, the power conversion system includes the control circuit 10 of the power conversion circuit in any of the above-mentioned embodiment and the power conversion circuit in any of the above-mentioned embodiment. The power conversion system may be a power source in an electronic device including, but not limited to, a smart phone or a computer.

In conclusion, the present invention can improve the conversion efficiency of the DC/DC conversion circuit and reduce noise interferences to other electronic devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit of a power conversion circuit which includes an energy storing circuit coupled between an AC/DC rectifier circuit and a DC/DC conversion circuit, wherein the AC/DC rectifier circuit includes a first output end and a second output end configured as ground, the energy storing circuit includes a first branch circuit and a second branch circuit coupled in parallel between the first output end and the second output end, the first branch circuit includes a first capacitor, the second branch circuit includes a second capacitor and a switch coupled in series, a rated voltage of the first capacitor is larger than a rated voltage of the second capacitor, and the control circuit is configured to:
 perform a predetermined operation when a first condition is satisfied, wherein:
  the predetermined operation includes providing a discharge current which flows out of the first output end for lowering a first voltage established at the first output end;
  a value of the discharge current is positively correlated with a voltage difference between the first voltage and a first reference voltage; and
  the first condition is satisfied when an absolute peak value of an input voltage of the AC/DC rectifier circuit is smaller than a second reference voltage;
 control the switch to turn on when the first condition and a second condition are both satisfied, wherein the second condition is satisfied when the value of the discharge current is smaller than a reference current; and
 control the switch to turn off when at least one of the first condition and the second condition is not satisfied.

2. The control circuit of claim 1, wherein the control circuit is further configured to convert the voltage difference between the first voltage and the first reference voltage into the discharge current.

3. The control circuit of claim 1, further comprising:
 a first circuit configured to:
  determine whether the first condition is satisfied based on the input voltage and the second reference voltage; and
  output a first signal when determining that the first condition is satisfied;
 a second circuit coupled to the first output end and the first circuit, and configured to:
  perform the predetermined operation when receiving the first signal; and
  output a second signal when the second condition is satisfied; and
 a third circuit configured to:
  control the switch to turn on when receiving both the first signal and the second signal; and
  control the switch to turn off when unable to receive at least one of the first signal and the second signal.

4. The control circuit of claim 3, wherein:
 the first circuit includes a first comparator configured to compare the input voltage or the absolute peak value of the input voltage with the second reference voltage, thereby outputting a corresponding compare signal; and
 the first circuit is further configured to output the first signal based on the compare signal.

5. The control circuit of claim 4, wherein:
 the compare signal includes a first compare signal serving as the first signal; and
 the first comparator is further configured to output the first compare signal when the absolute peak value of the input voltage is smaller than the second reference voltage.

6. The control circuit of claim 5, wherein the first reference voltage is the absolute peak value of the input voltage.

7. The control circuit of claim 5, wherein the first circuit further comprises:
 a peak value holding circuit configured to output the absolute peak value of the input voltage based on the input voltage.

8. The control circuit of claim 7, wherein the first reference voltage is the absolute peak value of the input voltage.

9. The control circuit of claim 4, wherein:
 the first comparator is further configured to output a second compare signal when the input voltage is larger than or equal to the second reference voltage;
 the first circuit further comprises a debounce circuit configured to output the first signal when the second compare signal is not received for a first predetermined period; and
 the first predetermined period is longer than or equal to a period of the input voltage.

10. The control circuit of claim 9, wherein the first predetermined period is shorter than or equal to 1.25 times the period of the input voltage.

11. The control circuit of claim 3, wherein the second circuit comprises:
 an operational transconductance amplifier coupled to the first output end and configured to convert the voltage difference into the discharge current when receiving the first signal;
 a current mirror circuit coupled to the first output end and the operational transconductance amplifier, and configured to output a mirror current of the discharge current; and
 a second comparator coupled to the current mirror circuit and configured to:
  compare the mirror current with the reference current; and
  output the second signal when the mirror current is smaller than the reference current.

12. The control circuit of claim 1, wherein:
the second condition is satisfied when the value of the discharge current is smaller than the reference current and when the value of the discharge current remains smaller than the reference current longer than or equal to a second predetermined period.

13. The control circuit of claim 1, wherein: the control circuit is further configured to control the switch to turn off when the value of the discharge current is larger than or equal to the reference current and when the value of the discharge current remains larger than or equal to the reference current longer than or equal to a second predetermined period.

14. A method of controlling a power conversion circuit which includes an energy storing circuit coupled between an AC/DC rectifier circuit and a DC/DC conversion circuit, wherein the AC/DC rectifier circuit includes a first output end and a second output end configured as ground, the energy storing circuit includes a first branch circuit and a second branch circuit coupled in parallel between the first output end and the second output end, the first branch circuit includes a first capacitor, the second branch circuit includes a second capacitor and a switch coupled in series, a rated voltage of the first capacitor is larger than a rated voltage of the second capacitor, and the method comprises:
performing a predetermined operation when a first condition is satisfied, wherein:
the predetermined operation includes providing a discharge current which flows out of the first output end for lowering a first voltage established at the first output end;
a value of the discharge current is positively correlated with a voltage difference between the first voltage and a first reference voltage; and
the first condition is satisfied when an absolute peak value of an input voltage of the AC/DC rectifier circuit is smaller than a second reference voltage;
controlling the switch to turn on when the first condition and a second condition are both satisfied, wherein the second condition is satisfied when the value of the discharge current is smaller than a reference current; and
controlling the switch to turn off when at least one of the first condition and the second condition is not satisfied.

15. The method of claim 14, wherein:
the second condition is satisfied when the value of the discharge current is smaller than the reference current and when the value of the discharge current remains smaller than the reference current longer than or equal to a second predetermined period.

16. The method of claim 14, wherein: the control circuit is further configured to control the switch to turn off when the value of the discharge current is larger than or equal to the reference current and when the value of the discharge current remains larger than or equal to the reference current longer than or equal to a second predetermined period.

17. A power conversion system, comprising:
a power conversion circuit, comprising:
an AC/DC rectifier circuit which includes a first output end and a second output end configured as ground;
a DC/DC conversion circuit; and
an energy storing circuit coupled between the AC/DC rectifier circuit and the DC/DC conversion circuit, and comprising a first branch circuit and a second branch circuit coupled in parallel between the first output end and the second output end, wherein:
the first branch circuit includes a first capacitor; and
the second branch circuit includes a second capacitor and a switch coupled in series, wherein a rated voltage of the first capacitor is larger than a rated voltage of the second capacitor; and
a control circuit configured to:
perform a predetermined operation when a first condition is satisfied, wherein:
the predetermined operation includes providing a discharge current which flows out of the first output end for lowering a first voltage established at the first output end;
a value of the discharge current is positively correlated with a voltage difference between the first voltage and a first reference voltage; and
the first condition is satisfied when an absolute peak value of an input voltage of the AC/DC rectifier circuit is smaller than a second reference voltage;
control the switch to turn on when the first condition and a second condition are both satisfied, wherein the second condition is satisfied when the value of the discharge current is smaller than a reference current; and
control the switch to turn off when at least one of the first condition and the second condition is not satisfied.

18. The power conversion system of claim 17, wherein the control circuit is configured to:
convert the voltage difference between the first voltage and the first reference voltage into the discharge current.

19. The power conversion system of claim 17, wherein:
the second condition is satisfied when the value of the discharge current is smaller than the reference current and when the value of the discharge current remains smaller than the reference current longer than or equal to a second predetermined period.

20. The power conversion system of claim 17, wherein the control circuit is further configured to control the switch to turn off when the value of the discharge current is larger than or equal to the reference current and when the value of the discharge current remains larger than or equal to the reference current longer than or equal to a second predetermined period.

* * * * *